WILLIAMS & BAUSMAN.
Cotton Planter.

No. 12,294.

Patented Jan. 23, 1855.

UNITED STATES PATENT OFFICE.

ISAAC WILLIAMS AND ISAAC W. BAUSMAN, OF ALLEGHENY COUNTY, PA.

IMPROVEMENT IN COTTON-SEED PLANTERS.

Specification forming part of Letters Patent No. 12,294, dated January 23, 1855.

*To all whom it may concern:*

Be it known that we, ISAAC WILLIAMS and ISAAC W. BAUSMAN, of Allegheny county and State of Pennsylvania, have invented a new and useful Improvement in Cotton-Seed Planters; and we do hereby declare that the following is a full, clear, and exact description thereof, reference being had to the annexed drawings, forming part of this specification, and to the letters of reference marked thereon.

Figure 1:
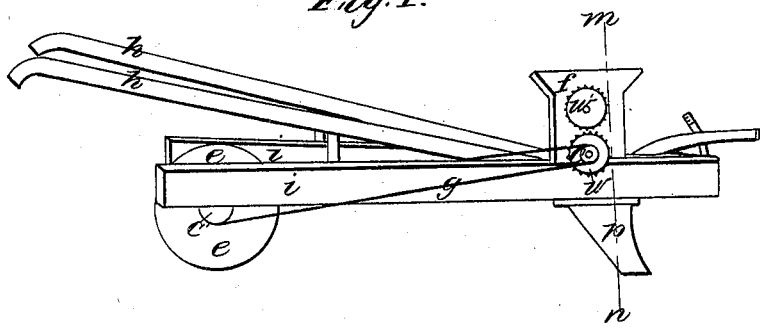
Figure 2:
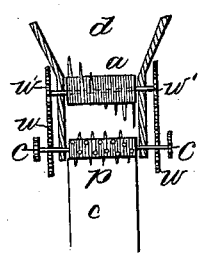

In the drawings, Figure 1 is a perspective side view of our seed-planter; and Fig. 2 is a vertical section through the machine at the point designated by the dotted lines *m n* in Fig. 1, showing the interior of the hopper and the situation and construction of the distributing and separating cylinders.

In the drawings Fig. 1, *i i* are two beams, which are placed at an acute angle and meet at the front of the machine. The handles *h h* are attached to the beams, and by means of them the operator guides the machine when in use. Between the beams *i i*, near the rear end of the machine, is a roller or wheel, *e*, with a flat surface, which rests on the ground and supports the machine. It also serves the purpose of covering the seeds when planted, and by means of the strap *g*, passing over a drum, *c'*, on the side of the roller, and a drum, *c*, on the side of the axis of the distributing-cylinder *b*, communicates motion to that cylinder.

Near the front of the machine, and resting on the beams *i i*, is the hopper *f*, below which is a deep and narrow throat or opening, through which the seeds are precipitated to the ground in the furrow made by the plow *p*. The plow *p* is attached to the under side of the beams immediately under the hopper, the toe of the plow being a short distance in advance of the aperture in the hopper. In the hopper are two solid cylinders, *a* and *b*, placed one immediately above the other and so far apart that the teeth of the upper cylinder, *a*, will not come in contact or interfere with the circumference of the lower cylinder, *b*. The axis of each cylinder passes through the box or throat of the hopper horizontally and projects from the hopper on each side. On each extremity of both axles are attached cog-wheels, which gear into each other, so that when motion is communicated to the lower or distributing cylinder, *b*, from the roller *e*, by means of the band *g*, both cylinders are turned and in reverse directions. The cylinder *a*, which we call the "separator," is furnished with long pointed teeth of iron, steel, or hard wood. These teeth are placed around the circumference of the cylinder *a*, passing around it in a helical direction and at uniform distances apart. These teeth serve to detach the cotton-seeds placed in the hopper *f* from the mass of seeds and fibers of cotton by which they are matted together, and passes them onto the circumference of the lower or distributing cylinder, *b*. The distributing-cylinder is furnished with a series of short teeth, long enough to carry round the cotton-seeds, and yet so short that the fibers will not adhere to it, so as to prevent the seeds falling out through the aperture in the bottom of the hopper into the hole or furrow prepared by the plow *p*. These teeth are also arranged helically around their cylinder *b*.

In order to secure the certain action of the machine, drums *c* and *c'*, on the axis of the distributing-cylinder *b* and the roller *e*, respectively, are placed on each side of the machine and attached by belts or bands *g*. It will be seen that this arrangement is very simple, the simplicity and efficiency of our machine being its chief recommendations.

We are aware that one or more shafts, with teeth, have been placed within the hopper, and that a single cylinder with a series of spirally set teeth has been employed in the throat of the hopper of seed-planters. We therefore do not claim these devices; but What we do claim as our invention, and desire to secure by Letters Patent, is—

The use and combination of two cylinders placed one above the other, not in the hopper, but in the throat below the hopper, one furnished with a row of long teeth and the other with a row of short teeth, the teeth on each cylinder being placed helically around it for the purpose of separating and distributing or scattering the cotton-seeds in the manner hereinbefore described.

ISAAC WILLIAMS.
I. W. BAUSMAN.

Witnesses:
  M. BUCKMASTER,
  WM. N. HOWARD.